(12) United States Patent
Lier

(10) Patent No.: US 11,223,126 B1
(45) Date of Patent: Jan. 11, 2022

(54) COMBINED CROSS-LINK AND COMMUNICATION-LINK PHASED ARRAY FOR SATELLITE COMMUNICATION

(71) Applicant: LOCKHEED MARTIN CORPORATION, Bethesda, MD (US)

(72) Inventor: Erik Lier, Lakewood, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 528 days.

(21) Appl. No.: 15/993,407

(22) Filed: May 30, 2018

Related U.S. Application Data

(60) Provisional application No. 62/637,326, filed on Mar. 1, 2018.

(51) Int. Cl.
*H01Q 3/26* (2006.01)
*H01Q 1/34* (2006.01)
*H04B 7/185* (2006.01)

(52) U.S. Cl.
CPC ............ *H01Q 3/2635* (2013.01); *H01Q 1/34* (2013.01); *H04B 7/18508* (2013.01); *H04B 7/18515* (2013.01); *H04B 7/18523* (2013.01); *H04B 7/18513* (2013.01)

(58) Field of Classification Search
CPC ............................... H01Q 3/2635; H01Q 1/34
USPC ................... 342/352, 368, 372, 377
See application file for complete search history.

(56) References Cited

U.S. PATENT DOCUMENTS

2019/0027482 A1\* 1/2019 Kim .................... H01L 27/2427

\* cited by examiner

*Primary Examiner* — Bo Fan
(74) *Attorney, Agent, or Firm* — Morgan, Lewis & Bockius LLP

(57) ABSTRACT

An apparatus includes a cross-link phased array and a communication-link phased array. The cross-link phased array and the communication-link phased array are integrated into a single array. The cross-link phased array and communication-link phased array comprise a multi-beam phased array. The cross-link phased array provides communication between multiple space vehicles and the communication-link phased array provides communication between the satellite and the ground GPS system.

13 Claims, 5 Drawing Sheets

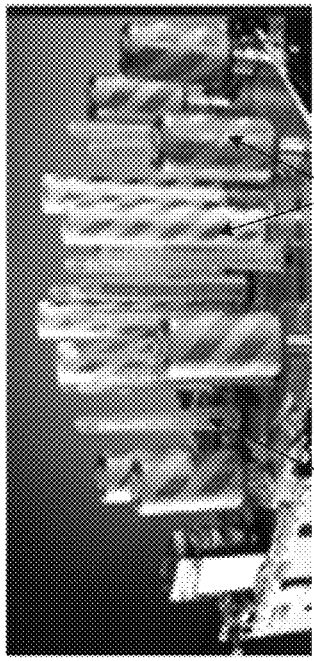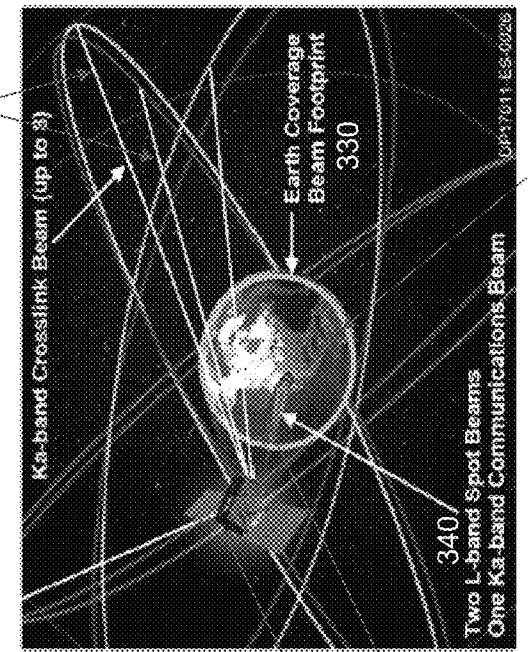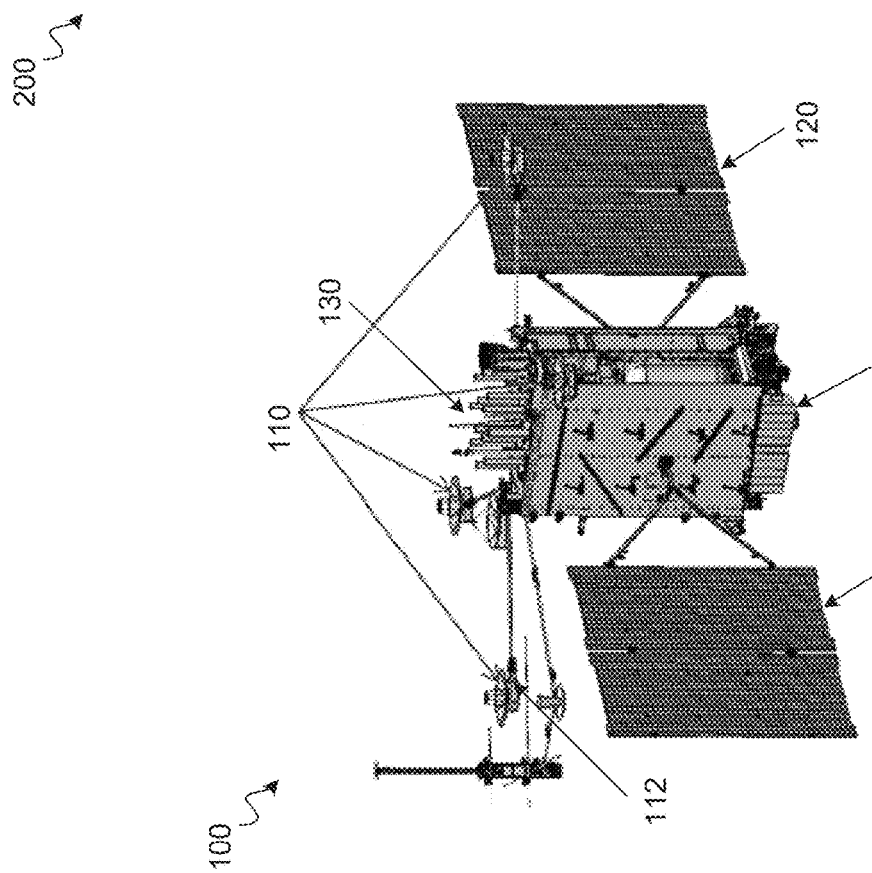
FIG. 1
FIG. 2
FIG. 3

COMBINED CROSS-LINK AND COMMUNICATION-LINK PHASED ARRAY FOR SATELLITE COMMUNICATION

CROSS-REFERENCE TO RELATED APPLICATIONS

This application claims the benefit of priority under 35 U.S.C. § 119 from U.S. Provisional Patent Application 62/637,326 filed Mar. 1, 2018, which is incorporated herein by reference in its entirety.

STATEMENT REGARDING FEDERALLY SPONSORED RESEARCH OR DEVELOPMENT

Not applicable

FIELD OF THE INVENTION

The present invention generally relates to antennas, and more particularly, to a combined cross-link and communication-link phased array for satellite communication.

BACKGROUND

Spacecrafts such as satellites may use cross-link antennas, also known as inter-satellite-link or inter-spacecraft link (ISL) antennas, to establish communications with other spacecraft or satellites. The satellites may be non-geostationary orbit (NGSO) satellites in communication with a number of global positioning system (GPS) cell phones or commercial television satellite dishes. The NGSO satellites can transmit data, for example, image data to a ground station, which can transmit the image data to a gateway of, for example, a standard commercial domestic satellite (DOMSAT). The DOMSAT may not have a cross-link antenna and may receive the image data from a gateway, which can relay the image data via an up-link to the DOMSAT. Satellites having an antenna farm including both communication and cross-link antennas can establish communication with other satellites as well as with ground stations.

SUMMARY

According to various aspects of the subject technology, systems and configurations are disclosed for providing a combined cross-link and communication link phased array for satellite communication.

In one or more aspects, an apparatus includes a cross-link phased array and a communication-link phased array. The cross-link phased array and the communication-link phased array are integrated into a multi-beam phased array. The cross-link phased array provides communication between space vehicles and the communication-link phased array provides communication between the satellite and ground stations.

In other aspects, a method of providing a common cross-link and communication antenna array includes forming a first antenna array from multiple first antenna elements including unfilled spaces. The method further includes forming one or more second antenna arrays from multiple second antenna elements, and disposing the second antenna arrays in the unfilled spaces to form the common cross-link and communication antenna array. The first antenna array includes a multi-beam ground communication-link phased array, and the second antenna array comprises a multi-beam cross-link phased array.

In yet other aspects, a communication satellite system includes an antenna array to provide cross-link and ground communications. The antenna array includes a cross-link phased array and a communication-link phased array. The cross-link phased array and the communication-link phased array include a multi-beam phased array, and the satellite system is a global positioning system (GPS) satellite system.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein:

FIG. 1 is a conceptual diagram illustrating an example of a communication satellite system including cross-link antennas.

FIG. 2 is a schematic diagram illustrating an example of a compact antenna farm including cross-link and communication-link antenna.

FIG. 3 is a conceptual diagram illustrating a satellite deploying an example of a combined antenna of the subject technology.

DETAILED DESCRIPTION

Figure 4B:
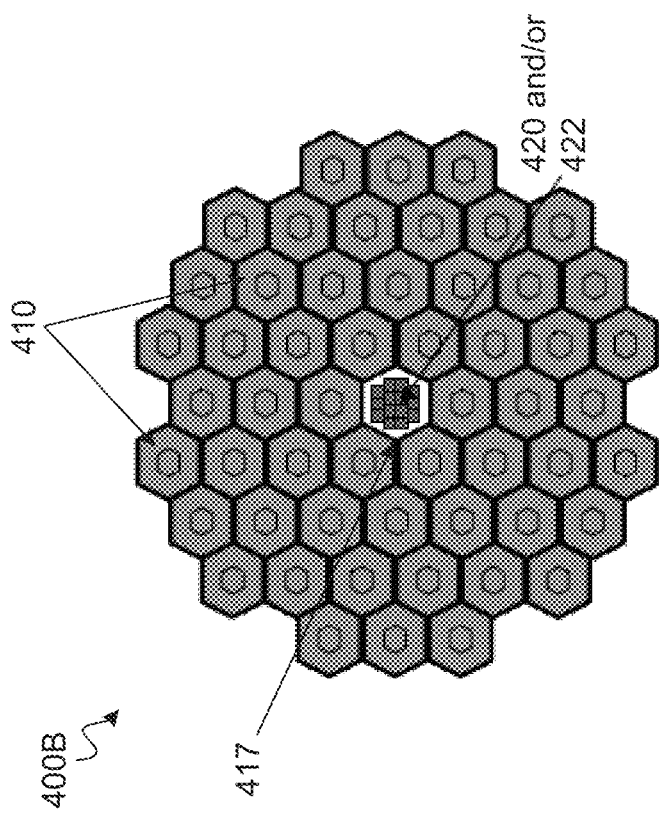
FIGS. 4A-4B are schematic diagrams illustrating examples of combined cross-link and communication-link phased arrays, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

According to some aspects of the subject technology, methods and configuration are disclosed for providing a combined cross-link and communication-link phased array for satellite communication. The subject technology combines the cross-link antenna and the communication-link antennas into a single widely scanned phased array antenna. The combined antenna of the subject technology can be mounted on the earth deck, predominantly pointed toward the earth, and typically toward the center of the earth. The element spacing of the disclosed combined antenna is typically about 0.5λ corresponding to the operating frequency or wavelength λ of the antenna, thereby allowing the antenna to be steered to about 60 degrees off boresight to communicate with other satellites. The phased array of the subject technology can have a small number of elements, for example, about 50, to a large number, for example, more than about 1,000 elements.

The existing cross-link antenna subsystems typically consist of four cross-link reflector antennas distributed around the spacecraft. The communication-link antenna may be a steerable reflector antenna or a phased array. These antennas can be expensive and heavy and may utilize significant real estate on the spacecraft. The disclosed combined antenna array may save manufacturing cost, is mass and real estate efficient and can be used in a variety of spacecrafts (e.g., satellites).

FIG. 1 is a conceptual diagram illustrating an example of a communication satellite system 100 including cross-link antennas. The communication satellite system 100 includes a satellite bus 102, cross-link antennas 110, an earth-facing antenna farm 130 and solar panels 120. The cross-link antennas 110 are four conventional directional reflector antennas coupled to the satellite main system 102 via four gimbals 112. The cross-link antennas 110 are conventional reflector antennas that are typically single beam, heavy weight and high cost antenna systems that offer limited flexibility in pointing to other cross-linked antennas. The earth-facing antenna farm 130 includes L-band navigation antennas. The satellite systems require more flexible and high data rate combined cross-link and communication-link antennas. The subject technology can provide high data-rate multi-beam combined cross-link and communication-link antennas for the satellite system 100. The combined antenna of the subject technology can provide fast beam-pointing and can be manufactured with a significantly lower weight and at a lower cost.

FIG. 2 is a schematic diagram illustrating an example of a compact antenna farm 200 including cross-link and communication-link antenna. The compact antenna farm 200 is a global positioning system (GPS) antenna farm with L-band navigation arrays 210 and ultra-high frequency (UHF) cross-link arrays 220. The use of the compact antenna farm 200 may result in reduced performance. Further, UHF cross-link antennas 220 may offer sub-optimal performance due to their lower frequency (300 MHz to 400 MHz) compared to Ka band (between 20 GHz and 30 GHz) used by the disclosed solution. The low performance may in part be caused by interference of UHF cross-link antennas 220. Further, the lower frequency of an antenna can translate into less directivity, whereas with the higher frequency band of the antennas of the subject technology, higher directivity and narrower spot beams can be achieved. Further, the UHF cross-link antenna is a single beam antenna, while the proposed Ka-band cross-link antenna is a multi-beam antenna where one can steer the beams independently and directly toward the other satellite for maximum directivity.

FIG. 3 is a conceptual diagram illustrating a satellite 300 deploying an example of a combined antenna of the subject technology. The satellite 300 can be a non-geostationary orbit (NGSO) satellite that deploys a combined cross-link and communication-link antenna including, for example, up to about 8 Ka-band cross-link beams for communication with other space vehicles through cross-link beams 310. The diagram shows several Ka-band cross-link beams 310 and a Ka-band communications beam as depicted by beams 320 over an earth coverage beam footprint 330. The diagram also shows two L-band spot beams 340 for navigation. In one or more aspects, the satellite 300 can be GPS satellite.

The disclosed combined cross-link and communication-link antenna can replace multiple gimballed and deployed reflectors and can offer strong connectivity with about ±60° elevation field-of-view. The combined cross-link and communication-link antenna of the subject technology can offer multiple beams for added flexibility, enables time and range measurements between satellites and can provide high data rate communication and real-time constellation management. Further, the disclosed technology allows multiple inter-satellite routes for resiliency, which can be enabled by use of digital processing.

Figure 4A:
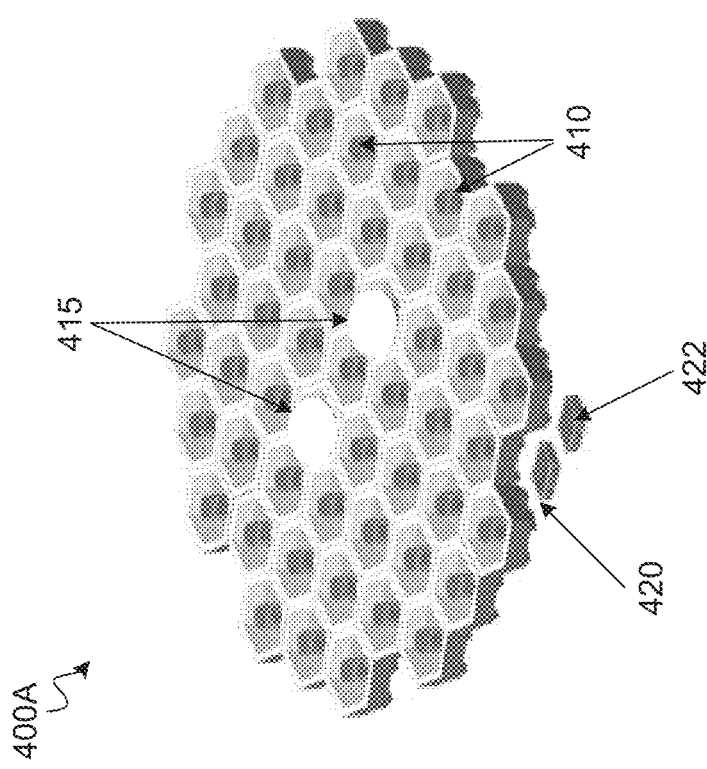

FIGS. 4A-4B are schematic diagrams illustrating examples of combined cross-link and communication-link phased arrays 400A and 400B, according to certain aspects of the disclosure. FIG. 4A shows an example of an antenna array of the subject technology including communication-link array elements 410 and unfilled spaces 415. The unfilled spaces 415 can be at any position of the antenna array and are not limited to the shown positions and can be filled with cross-link antenna arrays (or subarrays) such as cross-link antenna arrays 420 and 422. The communication-link array elements 410 can be navigation antenna elements, which collectively form a phased array for providing GPS navigation signals toward the ground users. The cross-link antenna arrays 420 and 422 can be Ka band transmitter (TX) and receiver (TX) phased arrays, although Ka band can be replaced with any other frequency band, such as V-band (40 GHz-75 GHz) or higher frequency bands. It is understood that the Ka-band has been proposed because of a low atmospheric attenuation, while some other bands such as V-band has high attenuation toward ground that demands higher power for the communications link.

FIG. 4B shows a top view of the combined cross-link and communication-link phased array of the subject technology. The communication-link array elements 410 are shown to be hexagonal in shape to provide nearly 100% array packaging efficiency as shown in FIG. 4B. The cross-link antenna arrays 420 and/or 422 are placed in a middle unfilled position 417. In other implementations, the cross-link antenna arrays 420 and/or 422 can be placed in any other unfilled position inside or outside of the navigation array 400B.

The disclosed cross link and/or communication link arrays, as shown in FIGS. 4A and 4B, are enabled by digital processing. Development of the cross-link array and digital processor of the subject technology can leverage features of an ongoing Lockheed Martin phased array. The combined antenna array of the subject technology may be built with bricks, in some implementations, or with tiles, in other implementations for lower cost, leveraging features of the ongoing phased array.

Figure 5A:
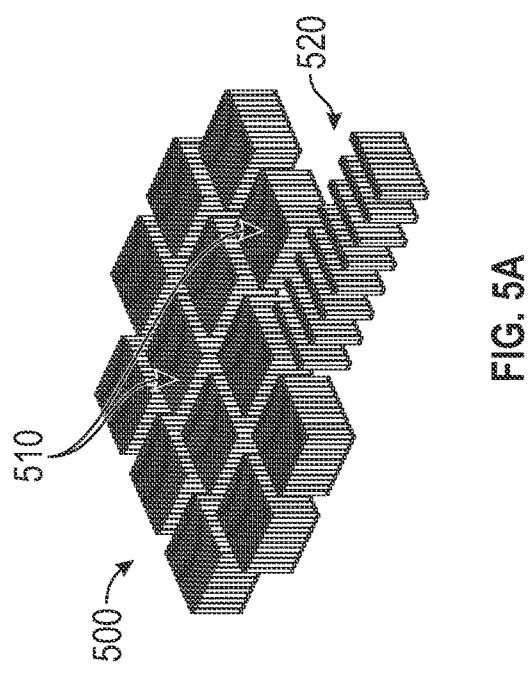
FIGS. 5A-5B are schematic diagrams illustrating structural views of an example brick-configured phased array, according to certain aspects of the disclosure.
Figure 5B:
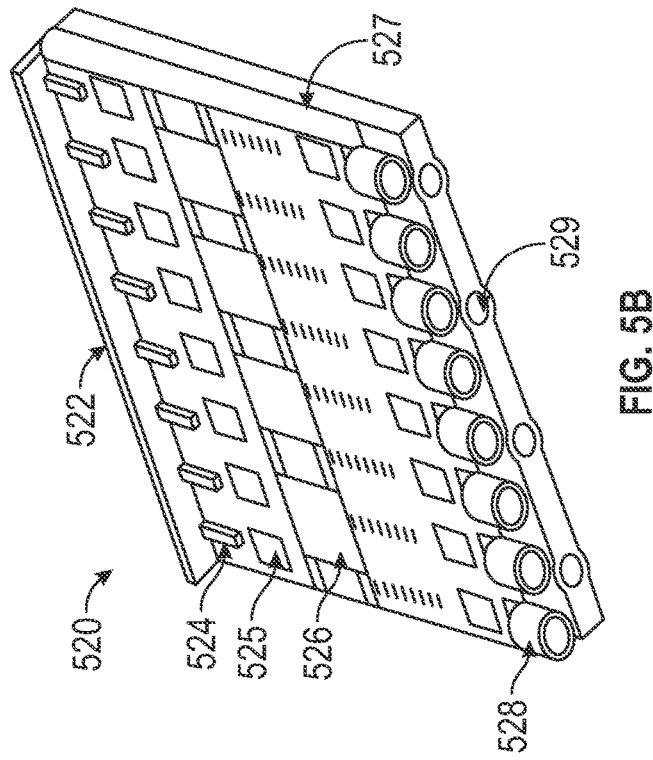

FIGS. 5A-5B are schematic diagrams illustrating structural views of an example brick-configured phased array 500, according to certain aspects of the disclosure. The example brick-configured phased array 500 shown in FIG. 5A depicts an example of the antenna array of the subject technology formed of a number of subarrays 510. As shown in FIG. 5A, each subarray 510 can be implemented as a collection of a number of antenna boards 520. In one or more implementations, each antenna board 520, as shown in FIG. 5B includes a multilayer RF board 527, on which an antenna element and input filter 522, low-noise amplifiers (LNAs) and/or power amplifiers 524 are mounted and coupled to arrays of various components. These components can include, but are not limited to, power dividers and/or combiners 525, beamforming integrated circuits (ICs) 526 and blind mate RF connectors 528. The beamforming implemented by the beamforming ICs 526 are core parts of the functionalities of the multilayer RF board 527. The beamformer sets up multiple beams and enables having multiple beams using the same aperture. The beamformer allows forming multiple beams for both cross-link and communication-link antennas. In some implementations, the antenna board 520 is formed on the multilayer RF board 527 that includes a number of heat spreaders 529. In some implementations, the combined cross-link and communication link antenna of the subject technology can be an eight beam phased array without gimballing and can operate in an ITU approved band of 22.55-23.15 GHz.

Figure 6:
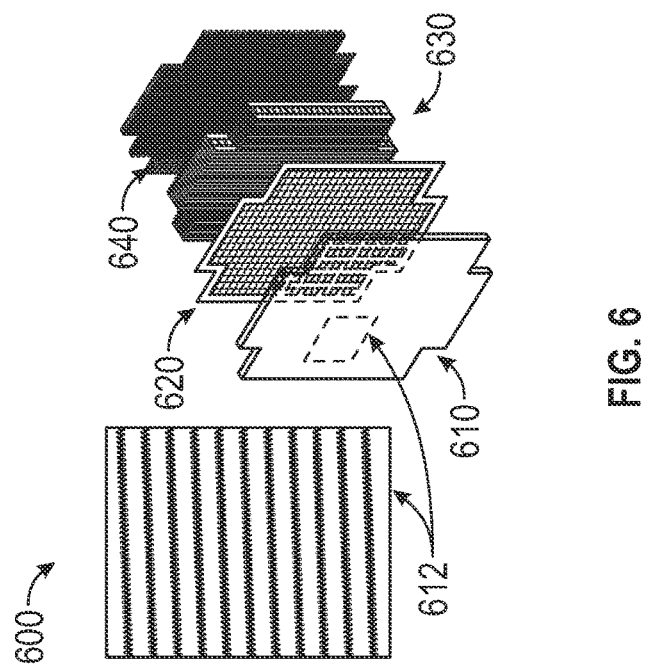
FIG. 6 a schematic diagram illustrating an exploded view of an example phased array, according to certain aspects of the disclosure.

FIG. 6 a schematic diagram illustrating an exploded view 600 of an example subarray of a phased array, according to certain aspects of the disclosure. The exploded view 600 of FIG. 6 shows an example structure of a subarray of a combined antenna array of the subject technology. The layers from top-to-bottom include one or more planar polarizers 610, an antenna element, filter and amplifier layer 620, a corporate feed network 630 and multilayer boards (MLBs) 640 with embedded electronic modules. The planar polarizers 610 can have a partially or fully grooved top layer, as shown in a blown-up view 612. The polarizer 610 can create a circular polarization from a linearly polarized source. The circular polarization allows the receiver on the ground to keep connection with the satellite without having to adjust rotational orientation of the receiver. The antenna element, filter and amplifier layer 620 can include any type of antenna element such as a dipole or a patch antenna element. The antenna element, filter and amplifier layer 620 can include cross-link and communication link antenna subarrays or elements of the subject technology, and LNAs and SSPAs. The corporate feed 630 is responsible for spreading the feed power to all antenna elements of the antenna element layer 620.

Figure 7:
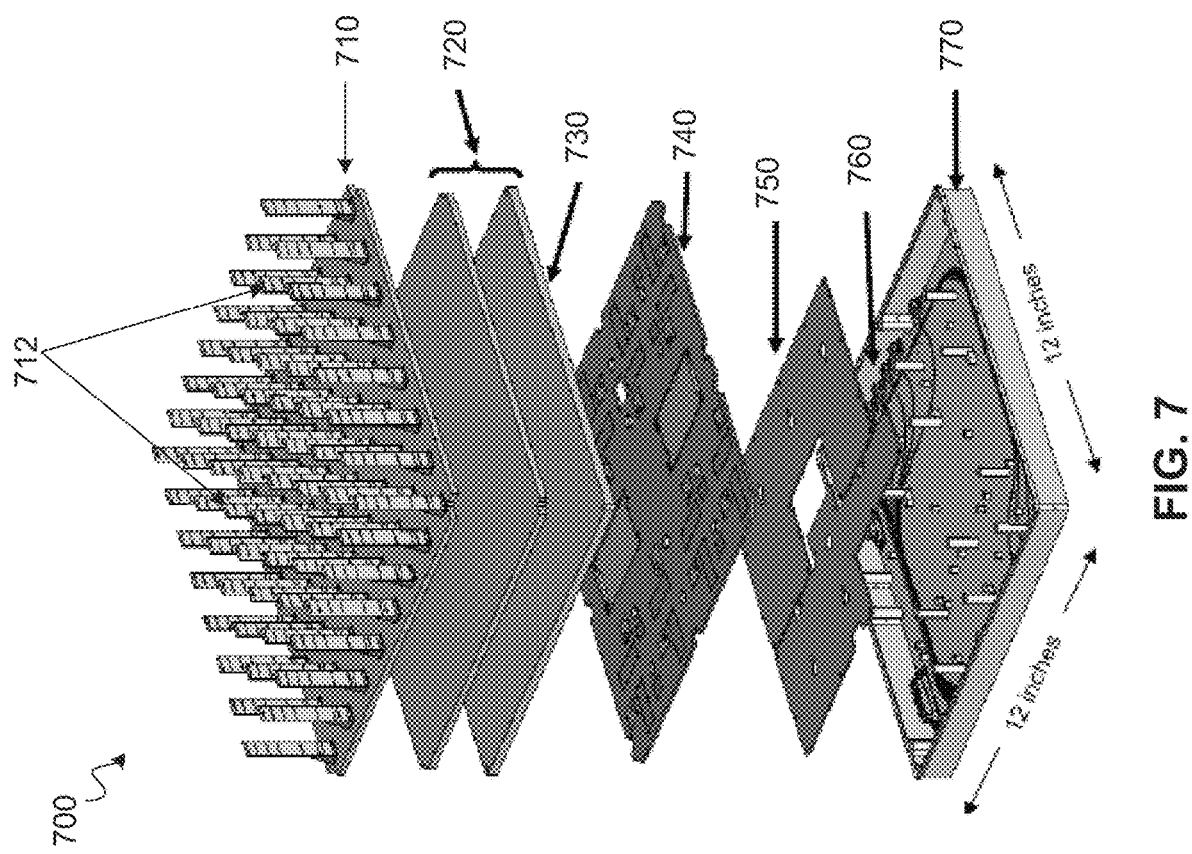
FIG. 7 a schematic diagram illustrating a structure of an example tile-configured phased array, according to certain aspects of the disclosure.

FIG. 7 a schematic diagram illustrating a structure of an example tile-configured phased array 700, according to certain aspects of the disclosure. The example tile-configured array 700 shown in FIG. 7 can be a lower-cost solution compared to the brick-configured array (e.g., 500 of FIG. 5A). The tile-configured phased array 700 has a multilayer structure and includes an antenna array 710 formed of endfire antenna elements 712 such as directive dipoles or helical elements, which can be mounted on a waveguide assembly layer 720. Solid-state power amplifiers (SSPAs) are mounted on a bottom surface 730 of the waveguide assembly layer 720 with upconverters or down-convertors. Also shown is an RF SSPA and IF (Intermediate Frequency) beamforming layer 740, which can be coupled to an electronic power controller (EPC) and tile controller (TC) board layer 750. The beamformer layer is an important part of the tile-configured phased array 700. The EPC is responsible for providing the right voltage to different components and the TC is part of a beamforming controller sub-system that controls phase shifts used for beamforming. A housing 770 may include a DC board that is responsible for providing DC power for RF electronic circuits, for example, on the RF SSPA and LNA and IF beamforming layer 740. In the housing 770 also are shown the locations 760 of a number of (e.g., 10) optical receiver. The antenna array 710 can include cross-link and communication link antenna subarrays or elements of the subject technology, for which the beamformer layer is responsible for setting up multiple beams.

Figure 8:
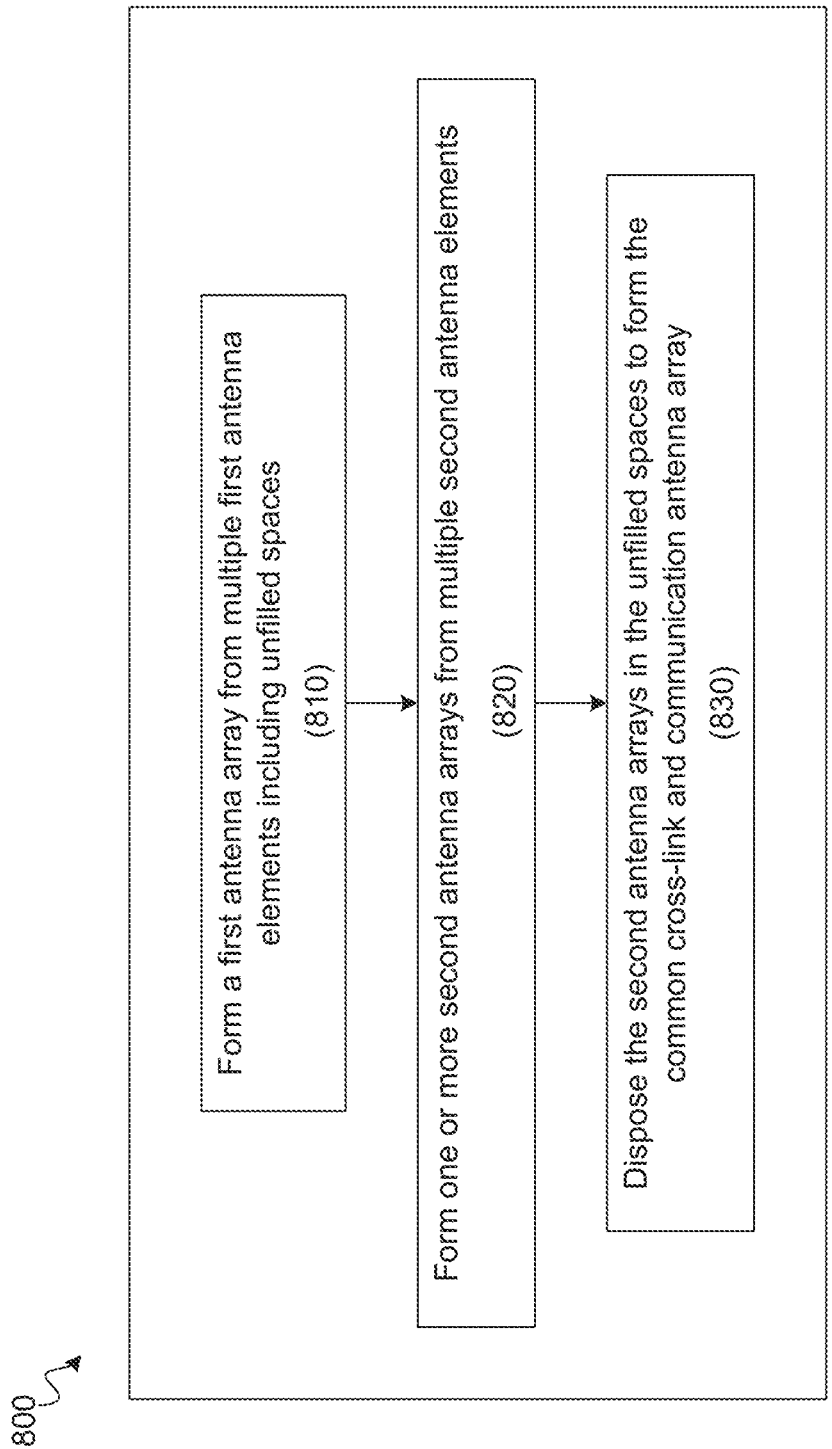
FIG. 8 is a flow diagram illustrating an example method for providing a combined cross-link and communication-link phased arrays, according to certain aspects of the disclosure.

FIG. 8 is a flow diagram illustrating an example method 800 for providing a combined cross-link and communication-link phased arrays, according to certain aspects of the disclosure. The method 800 includes forming a first antenna array (e.g., 400A or 400B of FIGS. 4A and 4B) from multiple first antenna elements (e.g., 410 of FIGS. 4A and 4B) including unfilled spaces (e.g., 415 of FIG. 4A) (810). The method further includes forming one or more second antenna arrays from multiple second antenna elements (e.g., 420 and 422 of FIG. 4A) (820). The second antenna arrays are disposed in the unfilled spaces to form the common cross-link and communication-link antenna array (830). The first antenna array includes a ground communication-link phased array, and the second antenna array comprises a multi-beam cross-link phased array.

In some aspects, the subject technology is related to a single widely scanned phased array antenna including a combined cross-link antenna and communication-link antennas. In some aspects, the subject technology may be used in various markets, including for example and without limitation, signal processing, space technology and communications systems markets.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. An apparatus comprising:
    one or more cross-link phased arrays; and
    a communication-link phased array including a plurality of communication-link elements,
    wherein:
    the one or more cross-link phased arrays and the plurality of communication-link elements are integrated into a single array, and
    the one or more cross-link phased arrays and the plurality of communication-link elements comprise a multi-beam phased array.

2. The apparatus of claim 1, wherein the one or more cross-link phased arrays is configured to operate in a Ka-band frequency including within a range of about 22.55-23.15 GHz.

3. The apparatus of claim 1, wherein the apparatus is configured to be installed on a satellite, wherein the satellite comprises a global positioning system (GPS) satellite.

4. The apparatus of claim 1, wherein the one or more cross-link phased arrays is configured to provide communication between multiple space vehicles, and wherein the communication-link phased array is configured to provide communication between a GPS satellite and one or more ground GPS systems.

5. The apparatus of claim 1, wherein the single array is configured as a brick array including multiple subarrays, wherein each subarray comprises a plurality of antenna boards oriented normal to an array aperture.

6. The apparatus of claim 5, wherein each antenna board of the plurality of antenna boards is configured to generate and steer multiple beams and includes a plurality of antenna elements, each antenna element of the plurality of antenna elements is integrated with an input filter, a low-noise amplifier (LNA) or a solid state power amplifier (S SPA), a power divider or combiner, and suitable beamforming integrated circuits.

7. The apparatus of claim 1, wherein the single array is configured as a tile array including antenna and waveguide-assembly layers disposed on electronic board layers parallel to an array aperture.

8. The apparatus of claim 7, wherein the antenna and waveguide-assembly layers comprise a plurality of antenna elements disposed on a number of first waveguide-assembly layer, wherein the first waveguide-assembly layer is coupled through one or more additional waveguide-assembly layers to the electronic board layers.

9. A communication satellite system, the system comprising:
    a communication satellite;
    an antenna array configured to provide cross-link and ground communications, the antenna array comprising:
    one or more cross-link phased arrays; and
    a communication-link phased array including a plurality of communication-link elements,
    wherein:
    the one or more cross-link phased arrays and the plurality of communication-link elements comprise multi-beam phased arrays.

10. The system of claim 9, wherein the antenna array is configured as a brick array including multiple subarrays, wherein each subarray comprises a plurality of antenna boards.

11. The system of claim 10, wherein each antenna board of the plurality of antenna boards includes a plurality of antenna elements, wherein each antenna element of the plurality of antenna elements is configured to generate multiple beams and is integrated with an input filter, a low-noise amplifier (LNA) or a power amplifier (PA), a power divider or combiner, and suitable beamforming integrated circuits.

12. The system of claim 9, wherein the antenna array is configured as a tile array including antenna and waveguide-assembly layers disposed on electronic board layers.

13. The system of claim 12, wherein the antenna and waveguide-assembly layers comprise a plurality of antenna elements disposed on a number of first waveguide-assembly layer, and wherein the first waveguide-assembly layer is coupled through one or more additional waveguide-assembly layers to the electronic board layers.

\* \* \* \* \*